April 2, 1968   B. M. GREENBERG ETAL   3,375,796
BLANK-FORMING APPARATUS
Filed Sept. 1, 1965   8 Sheets-Sheet 8

INVENTORS
BERTRAM M. GREENBERG
MARINUS TROAST, JR.
TIMOTHY TROAST

Amster & Rothstein
ATTORNEYS

United States Patent Office 3,375,796
Patented Apr. 2, 1968

3,375,796
BLANK-FORMING APPARATUS
Bertram M. Greenberg, Great Neck, N.Y., and Marinus Troast, Jr., Little Falls, and Timothy Troast, Pompton Lakes, N.J., assignors to I. C. Herman & Company, Inc., New York, N.Y., a corporation of New Jersey
Filed Sept. 1, 1965, Ser. No. 484,245
23 Claims. (Cl. 112—2)

ABSTRACT OF THE DISCLOSURE

A blank-forming apparatus having independently operated mechanisms for handling material, such as cloth, to successively form blanks thereof, wherein each of these mechanisms has a movement through a prescribed stroke and the control for the apparatus includes switches appropriately located to be actuated during the first-occurring stroke to initiate the second-occurring stroke and so forth, to thereby provide for the operation of the mechanisms in a prescribed sequence. A blank-advancing mechanism of the apparatus employs belts arranged to transport the edges of the blank to sewing machines, and which belts exert a drag on the cloth during movement thereof under the influence of the sewing machine feed dogs to facilitate the sewing of hems along edges of the cloth.

The present invention relates generally to an apparatus for handling textile, plastic, and like web materials, and more particularly to an improved apparatus for forming blanks of such material and for finishing the edges thereof with a hemmed construction.

A great variety of consumer products are fabricated of web materials in a square of rectangular shape and are finished along the edges by a stitched-down hem. Examples of such products are handkerchiefs, diapers, napkins, towels, tablecloths, blankets, and literally scores of like items. As might be expected, these products are each fabricated of a characteristic material which is best suited to the intended end-use, including for example such diverse textile materials as linen, cotton, terry cloth and wool. Thus, despite the similarity in shape and edge-finish of these numerous products, it is undoubtedly because of the dissimilarity in properties and characteristics of these diverse materials of fabrication that there is no adequate and acceptable apparatus available for handling and mass producing these products. For example, it is well known that the requirements for efficient sewing of these materials differs considerably. Likewise, the difficulty is readily apparent in the task of providing the necessary requirements for efficient movement in a single apparatus of such materials as linen and wool, with such different surface textures, resistances to movement, drape characteristics, and other differing properties. At any rate, despite the obvious desirability of having efficient, automatic apparatus for economically mass-producing these products, such apparatus is not available in the prior art.

Broadly, it is an object to provide an automatic, efficient blank-forming apparatus which is capable of handling diverse materials. Specifically, it is an object to provide an improved apparatus for unwinding successive lengths of a material from a supply roll, severing said lengths into blanks, and then providing a finished hem along the edges of the blank, all in accordance with an efficient, automatic production cycle.

It is a further object of the present invention to provide an improved blank-forming apparatus having not only diverse mechanisms for converting material in the bolt into finished products, but having also a construction and mode of operation uniquely suited to minimize malfunction and to facilitate the correction thereof. Thus, while the immensity of the task makes it difficult to avoid numerous moving parts and a relatively complex schedule of sequential movements of such parts in a typical production cycle, this unique construction and mode of operation which pinpoints any occurring malfunction is of considerable importance in avoiding costly non-productive machine down-time.

A still further object is to provide means for efficient sewing of the diverse materials handled and converted into blanks by the present apparatus, such means being readily adjustable to the sewing requirements of each material and producing a hem construction along the edges of the blank wherein there are remarkably few sewing rejects and the bulk of the production meets rigid commercial standards.

A blank-forming apparatus demonstrating features and advantages of the present invention includes as major components a supporting frame mounting a web material, such as cloth, put up into a supply roll, a cloth-gripping means movable back and forth between a clearance position and a cloth-engaging position for unwinding successive lengths of material from the supply roll, a material-cutting means movable across the width of the material for severing the unwound length from the supply roll and thereby forming a work-in-process cloth blank, and blank-advancing means preferably employing belts for clearing the blanks from within the apparatus supporting frame. Sewing machines are advantageously located in the feed path of the blank-advancing means and are effective to hem the edges of the blank advanced to the sewing machines. As is described in detail herein, the construction of the blank-advancing means and the operation thereof in tandem with the operation of the sewing machines is such as to contribute to an efficient sewing of the material being handled by the apparatus. In essence, the material is mechanically controlled during sewing in much the same way that an experienced seamstress pays-out material, by hand manipulation, to achieve efficient sewing.

A noteworthy feature of the apparatus is the employment of air motors to power the various parts thereof through movement, each of these air motors having valve means for controlling the admission of pressure air so as to render these air motors operational. Each of the valve means are in turn operatively associated with switches of the type actuated by physical contact, and such switches are appropriately located in the respective paths of movement of the moving parts so that actuation thereof is in accordance with a prescribed sequence. This results in operation of the various powering air motors in a corresponding prescribed sequence such that the blank forming and handling movements proceed in accordance with an efficient, automated production cycle. Moreover, a rarely occurring malfunction is easily detected since the apparatus will normally stop with the part having the malfunction in a position of movement short of the next switch which would have been actuated by this part but for the malfunction.

The above brief description as well as further objects, features and advantages of the present invention, will be more fully appreciated by reference to the following detailed description of a presently preferred, but nonetheless illustrative, embodiment in accordance with the present invention, when taken in conjunction with the accompanying drawings, wherein:

Figures 9, 10:
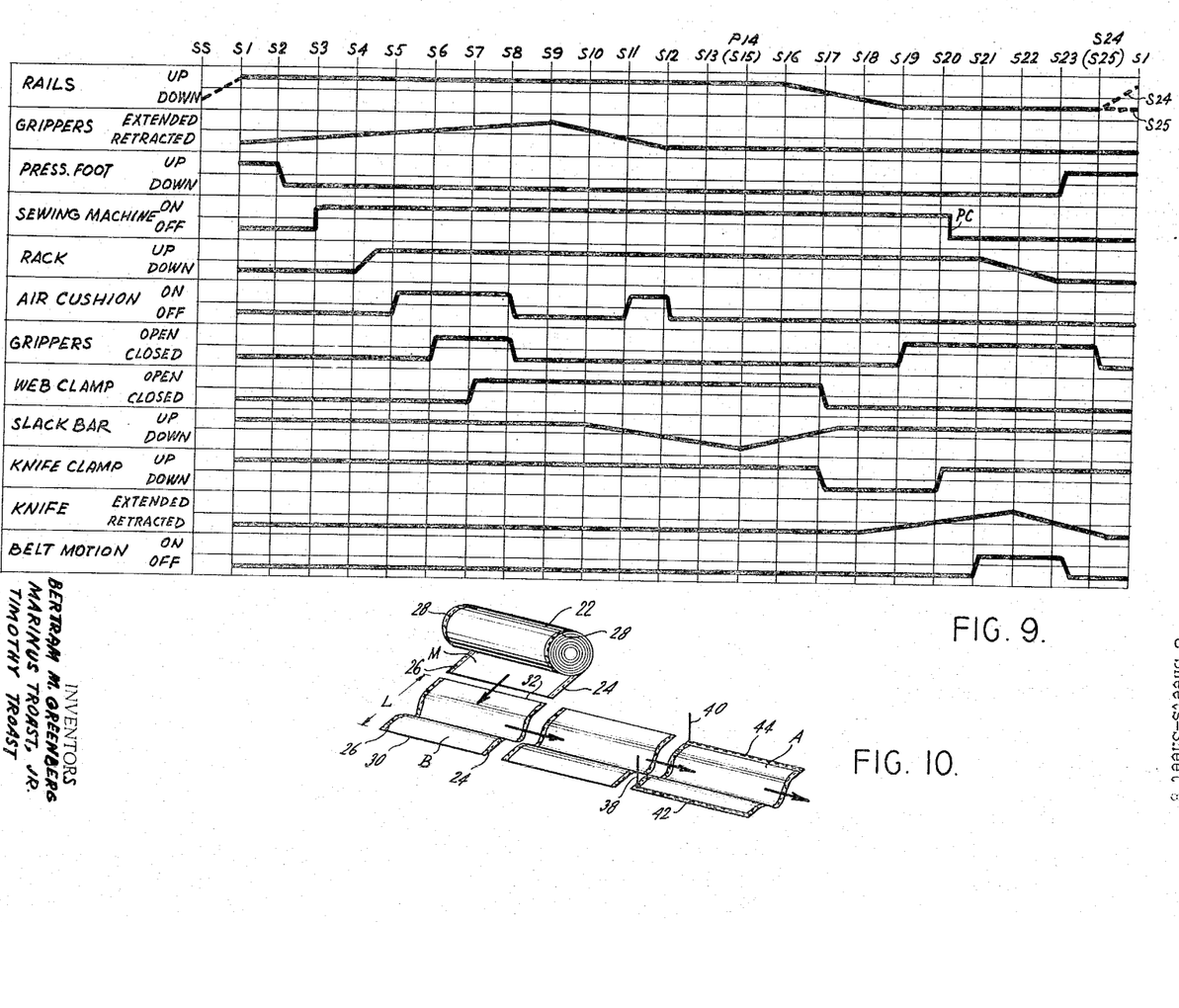
FIG. 9 is a chart of the major movements in a typical machine cycle, including the switches requiring actuation to initiate these movements, the condition of the equipment produced by the actuation of such switches, and the duration during which such condition of the equipment is maintained.
FIG. 10 is a flow diagram of the material, showing generally the condition thereof at various positions of movement through the apparatus of the present invention.

Reference is made to the drawings, and in particular to FIGS. 1–4 in conjunction with FIG. 10, FIGS. 1–4 showing an apparatus 20 demonstrating features of the present invention and FIG. 10 a bolt of material M in successive work-in-process conditions at various stages of movement through the apparatus 20. The type of material M may include cotton, terry cloth, linen, synthetic fiber blend fabrics, wool, as well as other web materials. Preferably, the material M is put up in a supply roll 22 for convenience in handling, and has already had the opposite edges 24, 26 thereon folded inwardly and hemmed, as by the stitching 28, to provide a finished appearance to these edges. Starting with material M in this condition, the operation of the apparatus 20 is effective to successively unwind measured lengths L of material M from the supply roll 22, and separate or remove each of these measured lengths of material from the supply roll 22, as by cutting, to thereby form each length into a work-in-process material blank B. This, however, produces unsewn opposite edge portions 30, 32 on the blank B also requiring finishing in the form of a stitched-down hem. Accordingly, the blank B is advanced along a feed path to a pair of spaced apart sewing machines 34, 36 respectively having vertically reciprocating sewing needles 38, 40 which are effective in producing a stitched-down hem 42, 44 along the edges 30, 32. The result is the production of a finished article of manufacture A wherein all four edges have a stitched hem. Popular examples of finished articles A may include, but are not limited to, handkerchiefs, diapers, towels, napkins, wash cloths, wipers, sheets, tablecloths, curtains, blankets, and like products.

Apparatus 20 includes a box-like frame structure 46 into one side of which the free edge of the material or cloth M is threaded, engaged along this edge by a gripping mechanism 48 and then unwound from the supply roll 22 across the frame structure 46 into a blank-forming station formed within the interior of the frame structure 46. At the blank-forming station, identified herein as 49, the cloth M is measured and severed from the supply roll 22 and then transported from this station by spaced blank-advancing mechanisms 50, 52 to each of the sewing machines 34, 36 which are respectively mounted on table supports 54, 55 at the right end of the apparatus 20 as viewed in FIG. 1.

Figure 1:
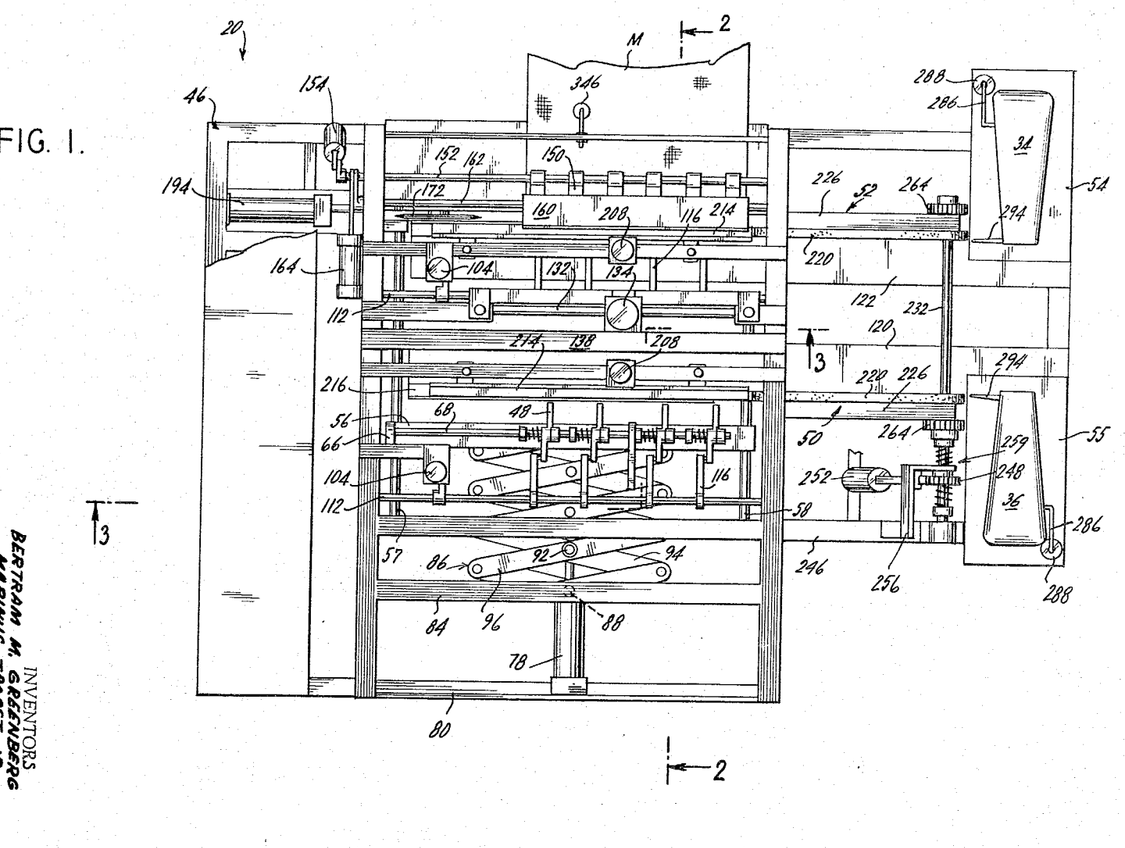
FIG. 1 is a plan view of an apparatus for making handkerchiefs and the like demonstrating features of the present invention.
Figure 2:
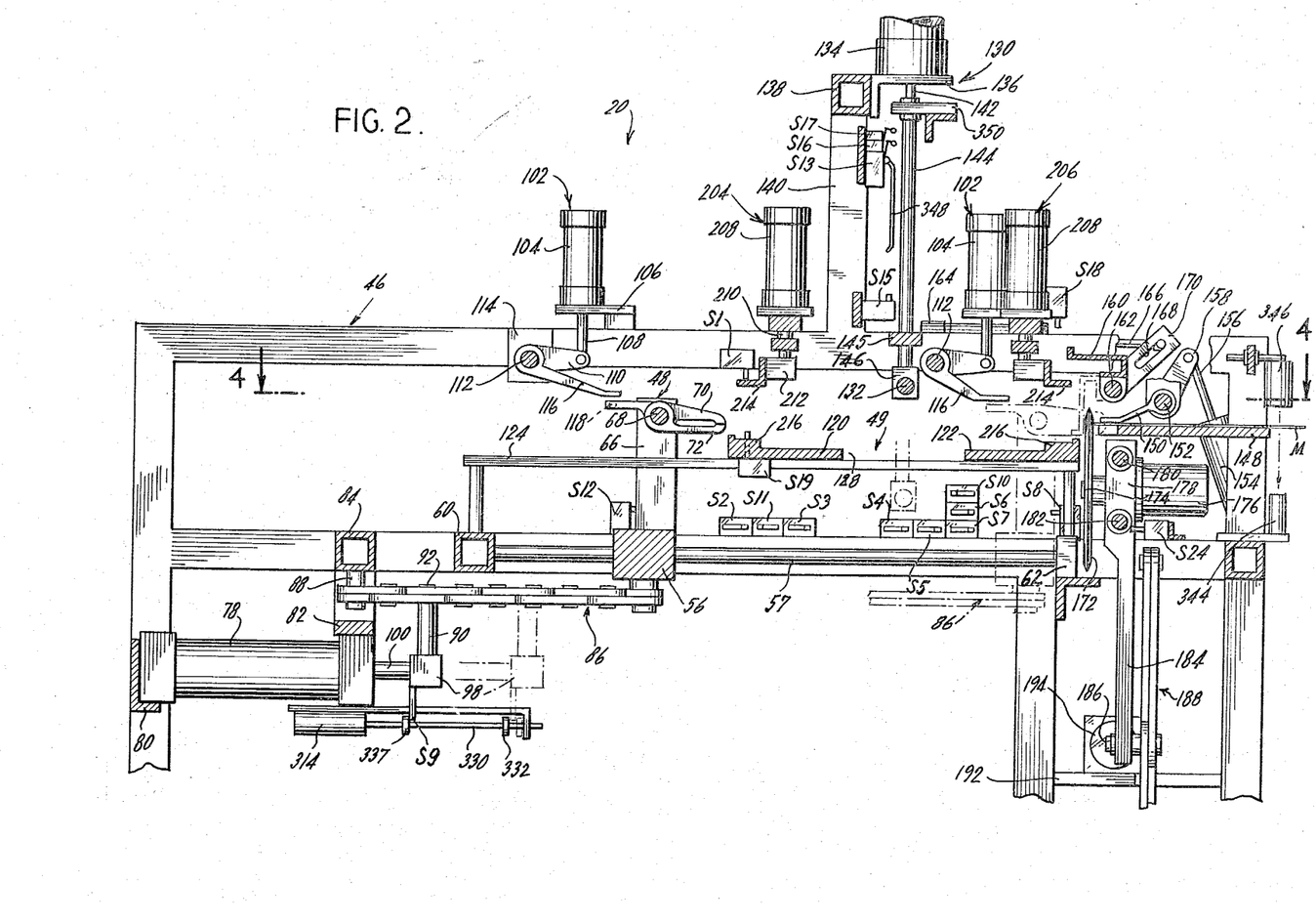
FIG. 2 is an elevational view, in section taken on line 2—2 of FIG. 1, illustrating further details of construc
Figure 4:
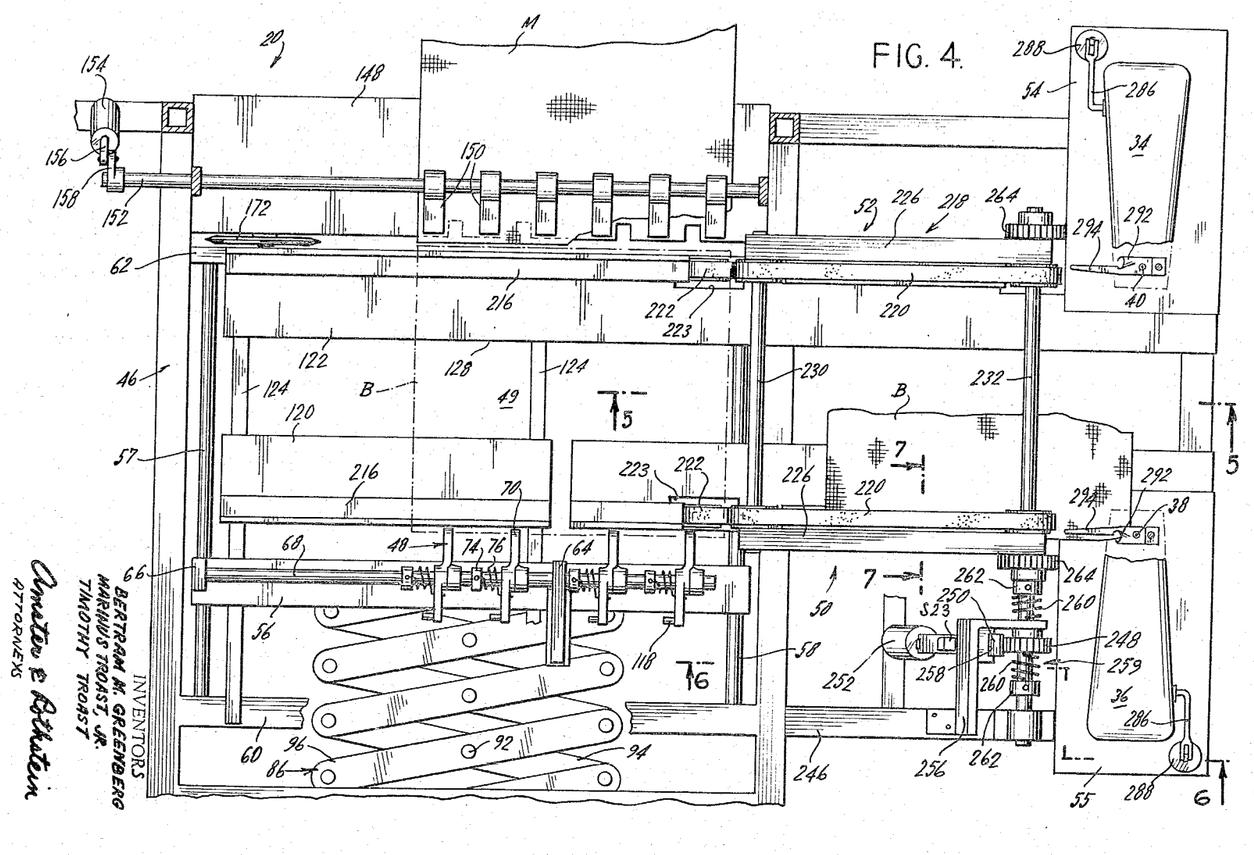
FIG. 4 is a plan view, in section taken on line 4—4 of FIG. 2, best illustrating the cloth-gripping mechanism of the apparatus.

As best seen in FIGS. 1, 2 and 4, the cloth-gripping mechanism 48 includes a beam support 56 mounted for reciprocating movement along spaced bars 57, 58 which are supported transversely of the frame structure 46 between frame members 60, 62. Mounted on the movable support 56 are upstanding supports 64 and 66 mounting a rod 68 supporting four pairs of cooperating grippers or gripping fingers 70, 72. The lower finger 72 of each pair is fixed on the rod 68 while the upper finger 70 is rotatably mounted thereon. Associated with each pair of fingers 70, 72 is a fixedly mounted collar 74 which engages one end of a helical spring 76 having its other end connected to a rearward extension of the upper finger 70 for normally biasing the upper finger 70 into a closed position against the lower finger 72.

Powering the gripping mechanism 48 through reciprocating movement across the frame structure 46 is an air motor 78 supported at one end on a horizontal brace 80 of the frame structure 46 and at its other end from a bracket 82 dependent from a horizontaly oriented frame member 84. One end of a movement-imparting gate mechanism 86 is connected to the movable support 56 while the other end is stationarily mounted, as at 88, to the frame member 84. A rod 90 extends from the pivotal connection 92 of the intersecting arms 94, 96 of the gate mechanism 86 and is connected to a block 98 on the end of the piston rod 100 of the air motor 78. Pressure air introduced into the air motor 78 is effective to power the piston rod 100 back and forth through the stroke illustrated in full line and phantom perspective in FIG. 2 which, in an obvious manner, opens and closes the gate mechanism 86 producing an amplified movement in the movable support 56 back and forth across the frame structure 46 along the bars 57, 58.

The foregoing movement produced by the air motor 78 is effective to actuate the gripping fingers 70, 72, from the clearance position on one side of the apparatus 20 as depicted in full line in FIG. 2 to an operative position on the other side of the apparatus depicted in phantom perspective. In this operative position, the gripping fingers 70, 72 are in an advantageous location to engage the free end of the material M and unwind a length of the material from the supply roll 22 during return movement back to its clearance position. To actuate the upper gripping finger 70 through rotative movement about the rod 68 and thus into an open position, there is provided a pair of identically constructed finger-opening mechanisms 102 in an advantageous location at the respective clearance and operative positions of the gripping mechanism 48 on opposite sides of the apparatus 20. For simplicity, only one of the finger-opening mechanisms 102 is described herein and similar parts of each are designated by the same reference numbers.

Each finger-opening mechanism 102 includes an air motor 104 supported in a vertical position on a bracket 106 appropriately mounted on the frame structure 46. The air motor piston rod 108 is connected at its free end to an actuating lever 110 fixedly connected to a shaft 112 journalled for rotation in opposite end bearing blocks 114 supported on the frame structure 46. Connected for movement in unison with the shaft 112 are spaced fingers 116 having a free end extending over a laterally disposed pin 118 in each of the rearward extensions of the rotative gripping fingers 70. The powering of the shaft 112 in rotation by the air motor 104 rotates the fingers 116 into contact with the fingers 70 and holds the fingers 70 open. In the clearance position of the gripping mechanism 48, the open position of the gripping fingers 70, 72 is required to release the material blank B preparatory to feed movement of this blank to the sewing machines 34, 36. In the operative position of the gripping mechanism 48 at the opposite side of the apparatus 20, the gripping fingers 70, 72 are opened as the gripping mechanism 48 completes its movement across the apparatus 20 and are thereafter closed upon the free end of the material M. Thus, the extent of terminal movement of the gripping mechanism 48 is such that the open gripping fingers 70, 72, as clearly shown in FIG. 2, actually project inwardly of the free end of the material M. As a result, upon counterclockwise rotative movement of the fingers 116, the rotating gripping fingers 70 are released and close about the edge of the cloth M under the urgency of the return spring 76. With the cloth M thusly engaged by the pairs of gripping fingers 70, 72, return movement of the gripping mechanism 48 back to the clearance position thereof is effective to unwind a length of material M from the supply roll 22.

The material M is thus held by the gripping mechanism 48 in a position spanning the apparatus 20 and overlying a pair of spaced tables 120, 122. These tables are supported in an elevated position within the frame structure 46 on vertical and horizontal frame members 124, in turn supported on the base frame members 60, 62. The tables 120, 122 define a feed path from the interior blank-forming station 49 within the frame structure 46 to the sewing machines 34, 36. Operating in the central opening 128 between the tables 120, 122 is a cloth-length measuring apparatus 130 including a horizontally oriented slack-bar 132. An air motor 134 powers the slack-bar 132 through a vertical stroke indicated in full line and phantom perspective in FIG. 2 through the opening 128 such that depending on the length of the vertical stroke, a measured length of the material M is unwound from the supply roll 22. The air motor 134 is mounted on a bracket 136 connected to a horizontal frame member 138 supported in an elevated position on an upstanding extension 140 of the frame structure 46. The motor piston rod 142 is connected to a frame 144 appropriately guided through vertical movement as at 145, and having a free end connection to blocks 146 mounting the slack-bar 132.

After a measured amount of material M is provided by the measuring apparatus 130, the mode of operation of the apparatus 20 contemplates the severing of the measured length of cloth from the supply roll 22 by a cut applied transversely of the cloth M. As best seen in FIG. 2, the end of the cloth M threaded into the right side of the apparatus 20 passes between a laterally supported table 148 and a so-called web clamp 150 mounted for rotation in unison with a rotatable shaft 152 powered by an air motor 154. The air motor has a usual reciprocating piston rod 156 connected to a lever 158 fixedly mounted on the shaft 152. Cooperating with the clamp 150 to firmly hold this area of the material M is a so-called knife clamp 160 rotatable from an opened position into a closed position upon the cloth M as indicated in full line and phantom perspective in FIG. 2. The clamp 160 is mounted for movement in unison with a rotatable shaft 162 powered in rotation by an air motor 164 having a reciprocating piston rod 166 operating in a slot 168 of a lever 170 fixedly mounted on the shaft 162. After unwinding a measured length of material M from the supply roll 22, the area on the material M between the closed clamps 160 and 150 is held firm for the stroke of a rotary knife 172 then actuated through movement along a path between the clamps 160 and 150 transversely of the width of the material M. This in an obvious manner is effective to sever the length of cloth at the blank-forming station 49 from the supply roll 22 and thereby form the work-in-process blank B.

Figure 3:
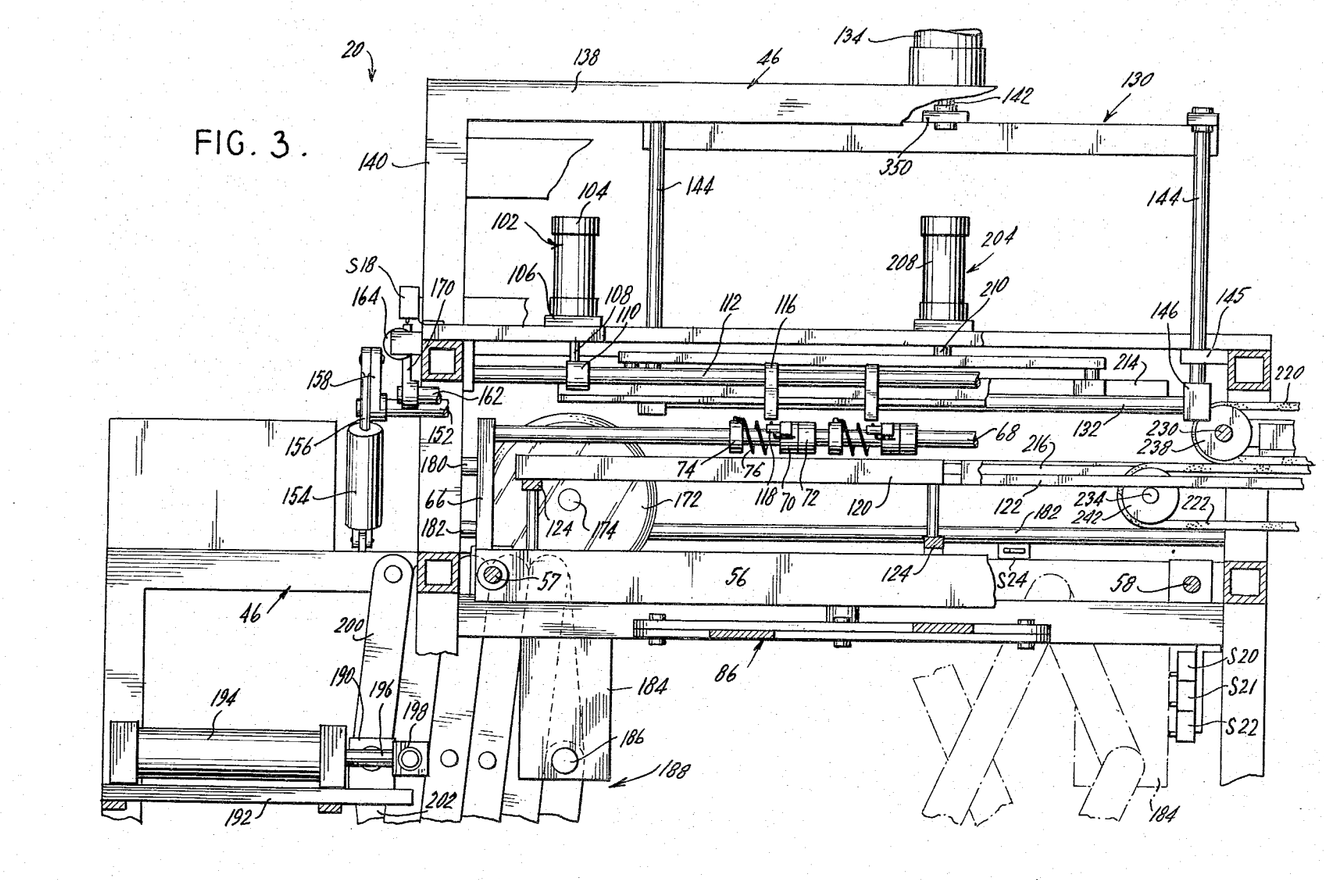
- FIG. 3 is an elevational view, in section taken on line 3—3 of FIG. 1, illustrating still further details of the construction of the apparatus, particularly of the rotary knife thereof.

As best seen in FIGS. 2, 3, the rotary knife 172 is mounted on an output shaft 174 of a motor 176 mounted in a block 178 disposed for reciprocating movement along vertically spaced bars 180, 182. A depending section 184 of the block 178 is connected, as at 186, to the terminal intersection of the arms of a gate mechanism 188. The other end of the gate mechanism 188 is fixedly mounted to a block 190 mounted on a shelf 192 supported from the base of the apparatus frame structure 46. An air motor 194 is stationarily mounted on the shelf 192 and the reciprocating piston rod 196 of this air motor is connected at its free end, at 198, to the intersection of the arms 200, 202 of the gate mechanism 188. Expansion and contraction of the gate mechanism 188 in an obvious manner produces reciprocating movement of the rotary knife 172 along a path transversely of the width of the material M.

Preparatory to release of one edge of the material blank B by the gripping mechanism 48 and the opposite edge thereof by the rotory clamp 160, appropriate blank-holding means 204, 206 are provided at advantageous locations above the support tables 120, 122 to hold these opposite edges of the blank B. This hold exerted on the blank B, however, is consistent with feed movement of the blank B from the blank-forming station 49 into the sewing machines 34, 36. Each of the blank-holding means 204, 206 is identically constructed and includes an air motor 208 supported vertically on the frame structure 46 to provide a vertical stroke to the usual reciprocating piston rod 210 of the motor. A block 212 is carried on the free end of each piston rod 210 and in turn mounts an L-shaped rail 214 which fits a cooperating stationary rail 216 provided lengthwise of each of the tables 120, 122. The unsewn opposite marginal edges 30, 32 of the work-in-process blank B are thus held by the upper movable rails 214 when they close upon the stationary rails 216 of the tables 120, 122. The cooperating rails 214, 216 however do not prevent sliding feed movement of the blank B along the tables 120, 122 into the sewing machines 34, 36 when the gripping mechanism 48 and rotary clamp 160 are respectively actuated to release the opposite edges of the blank B.

Figure 5:
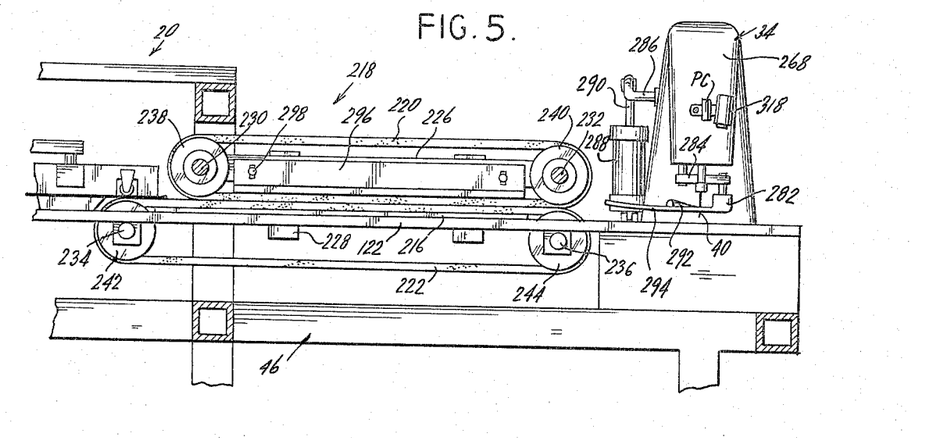
FIG. 5 is a partial elevational view, in section taken on line 5—5 of FIG. 4, showing details of the blank-advancing mechanism of the apparatus.
Figures 6, 7:
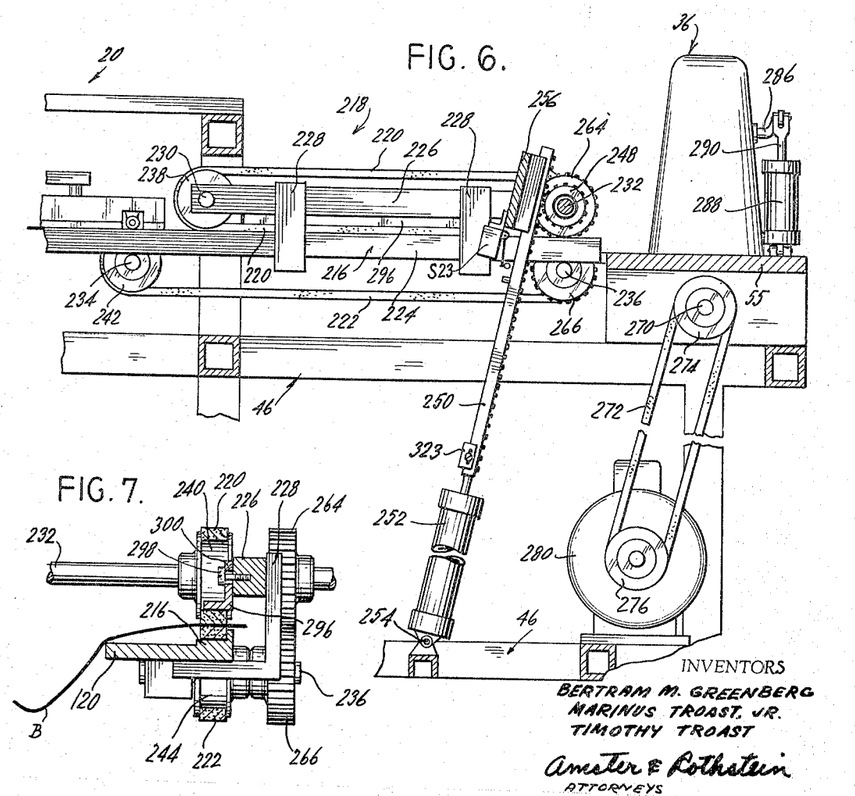
FIG. 6 is similarly a partial elevational view, in section taken on line 6—6 of FIG. 4, illustrating further details of the construction of said blank-advancing mechanism.
FIG. 7 is a partial front elevational view, in section taken on line 7—7 of FIG. 4, showing still further details of said blank-advancing mechanism.

Attention is now directed specifically to FIGS. 4–7 best illustrating the structural features of the substantially identically constructed blank-advancing mechanisms 50, 52 which are employed in the apparatus 20 for transporting the blank B from the blank-forming station 49 to the sewing machines 34, 36. Each blank-advancing mechanism 50, 52 includes a pair of cooperating upper and lower endless belts 220, 222 respectively, which span the distance along the apparatus frame structure 46 between the blank-forming station 49 and each of the sewing machines 34 and 36. Each of these belt arrangements 220, 222 is identical in construction and thus for simplicity only one of these arrangements will be described and similar parts on each identified by the same reference numbers. As best seen in FIG. 6, a pair of frame members 224, 226 are connected by vertical braces 228 in a substantially parallel relationship in the portion of the apparatus 20 spanning the distance between the gripping mechanism table 120 and sewing table 56. Four shafts 230, 232, 234 and 236 are supported transversely of the apparatus 20 between the opposite pairs of frame members 224, 226. As best seen in FIG. 5 in conjunction with FIG. 6, the upper belt 220 of each cooperating pair of belts is trained about pulleys 238, 240 mounted for rotation in unison with the shafts 230, 232. The lower belt 222 is similarly trained about pulleys 242, 244 fixedly mounted on the shafts 234, 236 and also extends slightly rearwardly of the rearwardly disposed pulley 238 of the upper belt 220. This locates the lower belt 222 within a slot 223 in the forward edge of each of the tables 120, 122 and beneath a front extending edge of each of the movable rails 214. Thus, as best shown in FIG. 5, the closing movement of the movable rails 214 upon the cloth blank B in position at the blank-forming station 49 is effective to press the leading portion of each of the opposite edges of the material blank B into contact with the lower belts 222. This, in an obvious manner, renders the lower belt 222 effective in transporting the blank B from between the rails 214 and 216 when the lower belts 222 are powered through movement in a direction towards the sewing machines 34, 36. As best seen in FIGS. 1, 6, the apparatus frame structure 46 includes, at the sewing machine end thereof, an extending frame member 246 substantially parallel to a frame member 226 of the blank-advancing mechanism 50 of the sewing machine 36. An extending end of the shaft 232 is supported between the frame members 246, 226 and has a pinion 248 fixedly mounted thereon in meshing engagement with a rack 250 which is powered through reciprocating movement by an air motor 252 pivotally connected, as at 254, to the base of the apparatus frame structure 46. A bracket 256 attached to the frame member 246 has a machined guide groove controlling the path of movement of the reciprocating rack 250. Mounting the pinion 248 on the shaft 232 is a conventional one-way rotation clutch unit 259, such as is available from the Nehl Manufacturing Company of Cincinnati, Ohio. For present purposes it is sufficient to understand that the clutch 259 includes helical spring means 260 appropriately attached at their respective ends to collar 262 fixedly mounted on the shaft 232 and at their respective inner ends operatively engaged with the pinion 248 so as to only transmit counter-clockwise rotation of the pinion 248 to the shaft 232. When powered in clockwise movement, the pinion 248 merely rotates freely about the shaft 232.

Mounted for rotation in unison with the power shaft 232 is a driving gear 264 in meshing engagement with a driven gear 266 fixedly mounted on the shaft 236. In this manner the shaft 236 is powered in rotation and actuates the lower belts 222 through movement in unison with the upper belts 220.

As best seen in FIGS. 5, 6, each of the sewing machines 34, 36 includes sewing mechanisms of conventional construction appropriately housed within sewing heads 268. Extending to the exterior of the heads 268 are the vertically reciprocating sewing needles 38, 40 having a conventional driving connection to a drive shaft 270 supported by the apparatus frame structure 46 beneath the sewing machine tables 54, 56. The drive shaft 270 is powered in rotation by an endless belt 272 trained about a pulley 274 fixedly mounted on the power shaft 270 and a pulley 276 fixedly mounted on an output shaft 278 of a motor 280 supported on the base of the apparatus frame structure 46.

It will be further understood that each of the sewing machines 34, 36 is equipped with the usual feed dogs which also have a driving connection with the drive shaft 270 and which during sewing of the sewing machines 34, 36 are powered in rotation and thus are effective to transport the material being sewn past the reciprocating sewing needles 38, 40. Consistent with usual practice, each sewing machine is additionally provided with a presser foot 282 having a clearance position above the sewing machine feed dogs and also an operative position lowered against these feed dogs to facilitate the driving action of the feed dogs. Thus, each presser foot 282 is connected to support a member 284 extended from within the sewing head 268 in the general area of each of the sewing machine needles 38, 40 and operatively connected at its opposite end to a crank 286 powered by an air motor 288 having a usual reciprocating piston rod 290 connected at its free end to the crank 286. In the illustrated embodiment, the presser foot 282 is integrally combined with a folding scroll or tool 292, which, operating in a well known manner, is effective to cause an inward fold along the edge of material which is threaded through the folding scroll 292. As is generally understood, the body 294 of the presser foot 282 is provided with an appropriate opening therein in an area coextensive with the scroll 292 and the sewing needles 38, 40. This provides access for the teeth on the feed dogs which extend slightly above each of the sewing tables 54, 56 to frictionally engage with material transported to the mouth of the folding scroll 292 and thereafter transport this material past the needles 38, 40 during sewing operation of the machines 34, 36.

An important contribution of the present invention is the arrangement and construction of each of the blank-advancing mechanisms 50, 52 which permits the application of a regulated drag-resistance along the edges of the blank B which acts in opposition to the force urgency of the sewing machine feed dogs. Thus, in the same way that an experienced seamstress pays-out material, by hand manipulation, against the force urgency of the sewing machine feed dogs during sewing of material, it is possible to regulate the drag-resistance exerted on the material by the blank-advancing mechanisms 50, 52. This in turn makes it possible to efficiently and effectively sew all types and grades of materials, with the further corresponding benefit of being readily able to adapt the apparatus to the production of an extremely wide range of products.

In a preferred embodiment illustrated in FIG. 7, an L-shaped holding member 296 is supported by bolts 298 disposed through vertical slots 300 in the vertical leg thereof and threadably engaging the frame member 226. It is therefore possible to adjust the position of the member 296 on the support frame 226 to the extent of the size of the slots 300. This enables regulating the degree to which the horizontal leg of the member 296 presses the lower course of the upper belt 220 against the upper course of the lower belt 222 riding in a continuation of the rail construction 216 of the tables 120, 122. In the operation of the apparatus 20, the cloth blank B is transported by the belts 220, 222 from the blank-forming station 49 in a forward feed direction toward the sewing machines 34, 36. The length of the driving rack 250 powering the belts 220, 222 through movement is of a length corresponding to the distance that must be traveled to transport the leading portion of the blank marginal edges 30, 32 up to the throat of each sewing machine folding scroll 292. At this time, the sewing machines 34, 36 are not operating and thus the feed dogs of these sewing machines are stationary. However, when the leading edge portion of the blank B is carried to the folding scrolls 292, the operation of each blank-advancing mechanism 50, 52 is terminated and the operation of the sewing machines is started. These sewing machine feed dogs thus engage with the blank B and are effective to force the unsewn edges 30, 32 of the blank through the folding scrolls 292 and past the sewing needles 38, 40. This, in an obvious manner, provides stitched-down hems 42, 44 to the blank B and completes the blank construction. Thus, at the time the sewing machine feed dogs first become operational, the length of the material blank from the leading edge portion thereof rearwardly to the trailing edge portion thereof is in an interposed position between the belts 220, 222. It is therefore possible to adjust the member 296 to exert a drag resistance on this blank length. The degree of this drag resistance is a function of the nature and weight of the material being sewn and in practice is readily empirically determined to achieve efficient sewing of the material.

Figure 8:
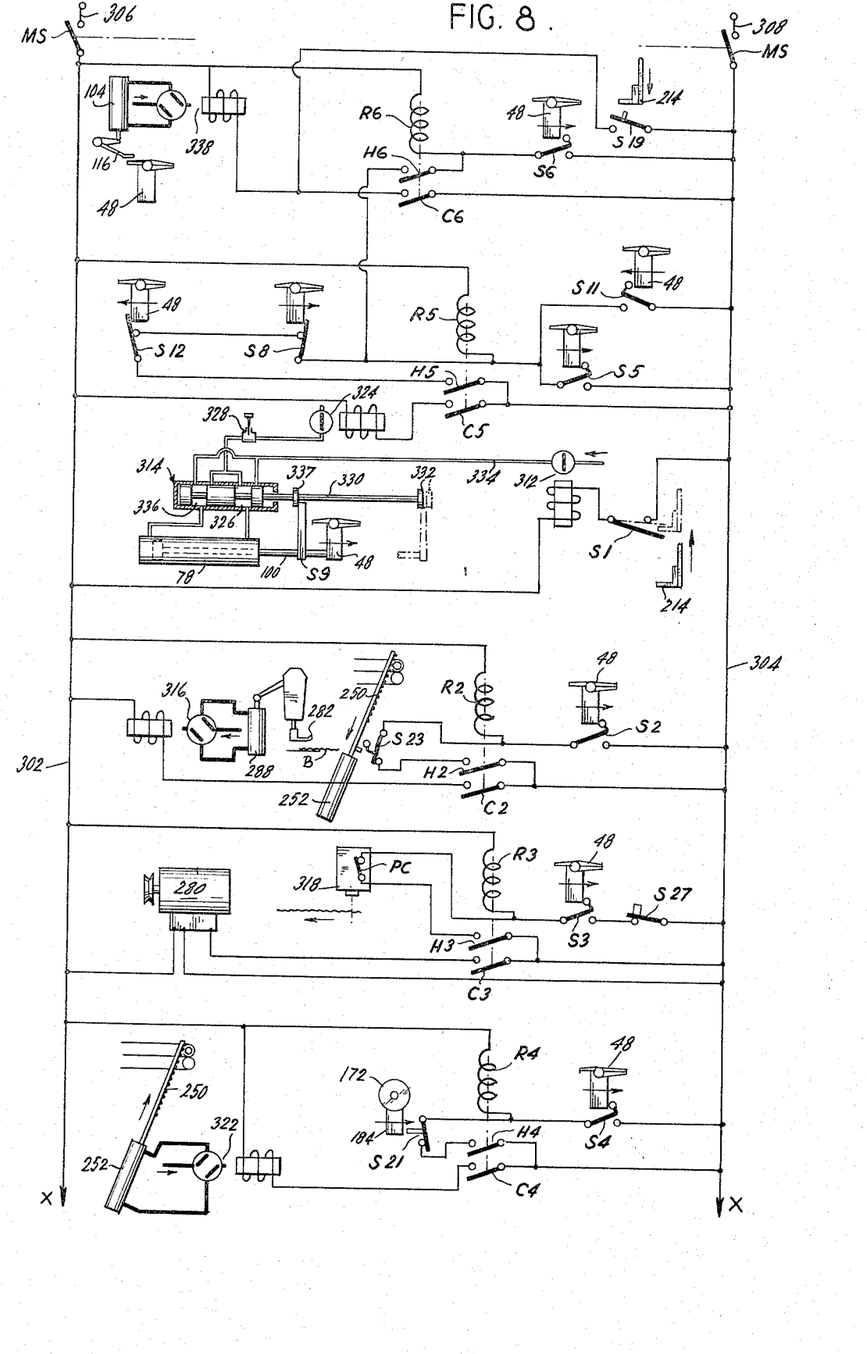
FIGS. 8 and 8A are diagrammatic views of an exemplary electrical control circuit, including pneumatic valves and switching mechanisms, for the apparatus of the present invention.
Figure 8A:
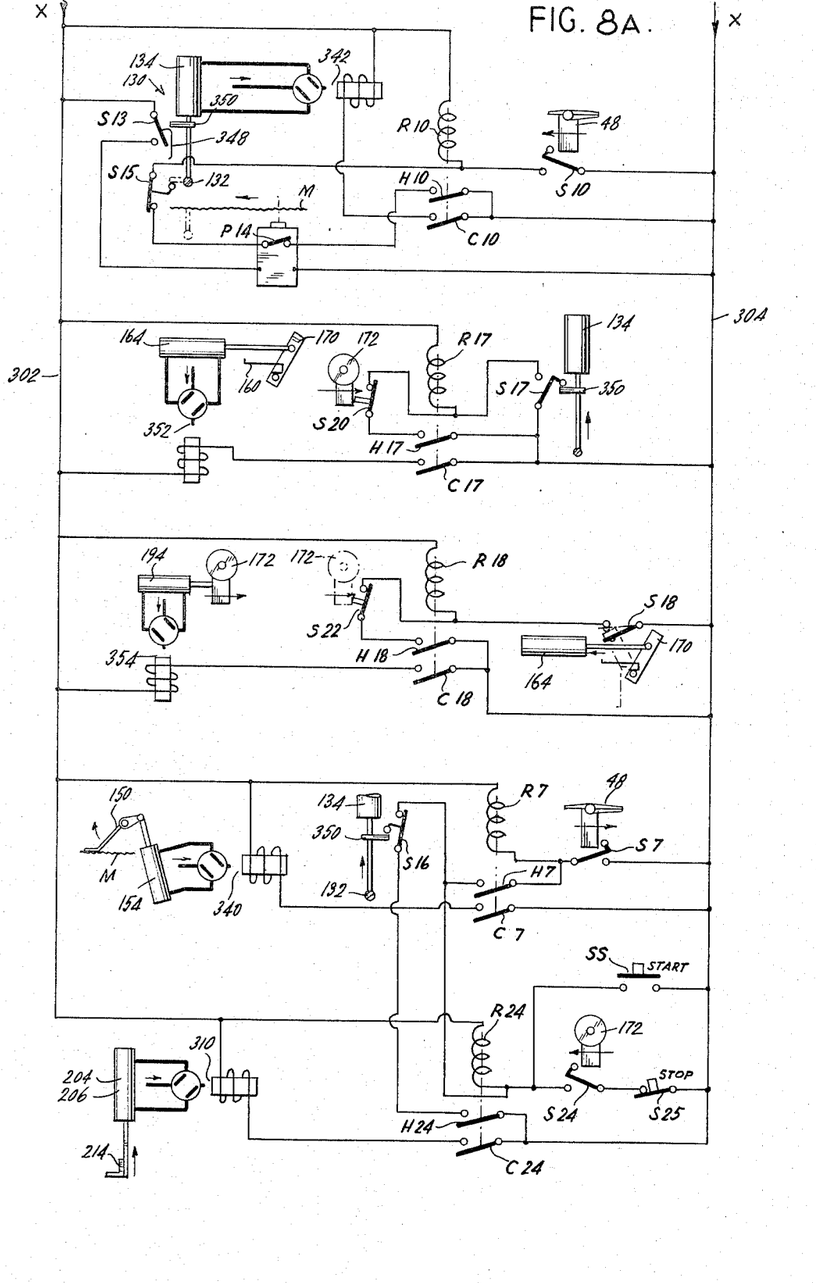

Attention is now directed to FIGS. 8 and 8A in which there is shown an exemplary electrical circuit for achieving the sequential operation of the various components of the apparatus 20 in accordance with an efficient, automated production cycle. This control circuitry includes the usual power lines 302, 304 having a main switch MS connection to contacts 306, 308 of an appropriate electrical power source. Connected in parallel across the power lines 302 and 304 are a number of sub-circuits including holding relays collectively designated R, circuit switches S, and relay holding and circuit-completing contacts H and C, respectively. In accordance with an essential feature of this control circuitry, the switches S are strategically located in the path of movement of the moving parts of the apparatus 20 and are adapted to be actuated into a closed position (and in some instances into an open position) upon physical contact of this moving part. Thus, the use of the switches S makes it easy to locate any malfunction of the apparatus 20 since the machine will stop with the part having the malfunction in a position of movement short of the next switch S which would have been actuated by this machine part but for the malfunction.

In the present description of the circuitry, the assumed starting condition of the apparatus 20 is that where the movable rails 214 are in their raised position, with the left-hand rail holding the switch S1 in a closed position. Assuming further that the master starting switch SS in the sub-circuit at the bottom of FIG. 8A is closed, this has the obvious effect of energizing the relay R24 and results in the simultaneous closing of the relay contacts H24, C24. The closing of the relay contact C24 completes a circuit energizing the coil of a solenoid valve 310 associated with the air motors 204, 206 powering the movable rails 214. This has the effect of pulsing the valve 310 out of the illustrated position into a position in which pressure air is channeled into the air motors 204, 206 on the side of the piston operating within these air motors to produce a downward movement of the movable rails 214. This is the assumed starting movement of the production cycle of the apparatus 20.

The first result of downward movement of the movable rails 214 is the opening of switch S1 and thus the breaking of the sub-circuit associated with the solenoid valve 312 which previously was holding an air valve in a position blocking the entry of pressure air into the air motor 78 powering the gripping mechanism 48. Thus, with the opening of switch S1, pressure air is admitted via a direction-changing valve 314 into the air motor 78 and is effective to actuate the gripping mechanism 48 into movement transversely of the apparatus 20 and toward the free end of the material M. As clearly shown in FIG. 2, upon movement of the gripping mechanism 48 switch S12 is released, and other switches S2, S11, S3, S4, S5, S6, S7, S10 and S8 in the order named, are appropriately mounted on the frame structure 46 in the path of movement of the gripping mechanism 48 so as to be actuated by physical contact of the gripping mechanism 48. The switches S2–S8, inclusive, are actuated during the initial half of movement, and the switches S10, S11 during the final half or return movement.

Starting first with switch S2, as clearly shown in the fourth sub-circuit of FIG. 8, movement of the gripping mechanism 48 in the direction indicated by the arrow closes switch S2 and completes a circuit for the relay R2. It should be mentioned at this point that switch S2 is typical of most of the switches S in that only movement in one direction as indicated by the reference arrows in FIGS. 8, 8A is effective to operate the switches, whereas movement in the reverse direction occurs over a roller and is ineffectual in causing pivotal movement of the switch into a circuit-closing or circuit-opening position. Such switches are conventional, being available for example from the National Electric Company of Passaic, N.J. The energizing of relay R2 closes the contact H2 completing a holding circuit for this relay through the normally closed switch S23, even after the gripping mechanism passes over the switch S2 and switch S2 opens under spring urgency. Thus, the operating contact C2 of the relay R2 remains closed and completes a circuit for the solenoid operated valve 316 associated with the air motors 288 controlling movement of the presser foot 282 of each of the sewing machines 34, 36. Air valve 316 is pulsed from the position shown into a position channeling the pressure air into each air motor 288 so that there is rotation in the crank 286 causing each presser foot 282 to be lowered against the leading end portion of the material blank B which has been transported by the blank-advancing means 50, 52 to the throat of each presser foot folding tool 292.

Next, the gripping mechanism 48 actuates the switch S3 into its closed position completing a circuit energizing the relay R3 which is maintained energized through the holding circuit completed by the closing of the relay contact H3. The foregoing assumes that the switch S27 is in its normally closed position and also that the switch PC of an electric eye associated with each of the sewing machines 34, 36 is closed. Switch S27 is a hand-operated master switch located within reach of the seamstress. The assumption that the switch PC of the electric eye of each of the sewing machines is closed at this time is based on the fact that the material blank B is then in position at the throat of each folding tool 292 and thus reflects the light from the light source 318 (see FIG. 5) into the photocell of the electric eye. This, in a manner which is well understood, is effective to maintain the electric eye internal switch PC in a closed position. Thus, relay contact C3 closes and results in movement of the clutches of each of the sewing machines 34, 36 into an operative position producing sewing and operating the feed dogs to transport the blank B past the sewing needles 38, 40. Sewing continues until the blank B is transported beyond the light source 318 of the electric eye when the electric eye contact PC opens to break the holding circuit for the relay R3. When this occurs, the relay contact C3 opens to disengage each sewing machine clutch and terminate sewing by each sewing machine 34, 36.

During movement of the gripping mechanism 48, switch S4 is also actuated closed and, as shown in FIG. 8, is effective to energize the relay R4 closing the contacts H4 and C4. The contact H4 completes a holding circuit through the closed switch S21, one of three switches located on a bracket 320 in the path of movement of the rotary knife 172 (see phantom perspective position of movement in FIG. 3). The closing of the relay contact C4 completes a circuit for the solenoid-operated valve 322 associated with each air motor 252 powering the blank-advancing mechanisms 50, 52. This results in the air valve 322 being pulsed out of the position shown into a position channeling pressure air into the air motor 252 to project the rack 250 away from the air motor cylinder into an extended ready position. The clockwise rotation of pinion 264 which this produces, because of the clutch 259, does not power the shaft 232. It does however result in the rack 250 being projected into a starting position for its reverse direction power stroke producing counterclockwise rotation in the pinion 248 which is effectively transmitted via the clutch 259 to produce rotation of the power shaft 232. In the event that the air cylinder of the air motor 252 is too large and the rack stroke, measured from an extreme extended position to the bottoming of the piston, would carry the blank B beyond the folding tool 292, this is rectified by adjustment of the stop 323 on the rack. The location of this stop 323 is adjustable along the length of the rack 250 to establish a power stroke starting position which will provide the proper length of travel during this stroke.

Next in time the gripping mechanism 48 actuates the switch S5 closed thereby energizing the relay R5 and closing the relay contacts H5 and C5. One result is the completion of a holding circuit for the relay R5 through the contacts H5 and the then closed switches S12 and S8. As clearly shown in FIG. 2, the switches S12 and S8 are located at extreme points at opposite ends of the path of movement of the gripping mechanism 48 and are therefore clear of this mechanism, then at an in-between point in its path of movement. The closing of the relay contact C5 completes the circuit energizing the solenoid-operated air valve 324 associated with the air motor 78 powering the gripping mechanism 48. This results in the air valve 324 being pulsed out of the position shown into a position blocking the entrance of pressure air into the valving mechanism 314. This results in the valve chamber 226 exhausting to atmosphere via the check valve 328 and thus the imposition of a pressure load against movement of the valve member 330 depending upon the extent that the exhaust orifice of this valve is restricted. While eventually the valve member 330 is contacted by the moving gripping mechanism 48 and reverses direction of this gripping mechanism, the exhausting of the valve chamber 326 through the check valve 328 provides a controlled slow-down in movement of the gripping mechanism 48 cushioning the striking blow of this part against the frame member 62. This same result is produced by the switch S11 during reverse movement which occurs upon contact of the switching member S9 mounted on the air motor piston rod 100 with a collar 332 of the valve member 330. This contact moves the valve member 330 within the valve 314 into a position redirecting the pressure air through the main pressure line 334, through the valve chamber 326, and into the end of the air motor 78 which causes a reversal in direction of the gripping mechanism 48. Upon reverse direction movement of the gripping mechanism 48, the same switching member S9 at the terminal portion of this reverse movement contacts another collar 336 of the valve member 330 causing movement thereof which blocks off the chamber 326 from the pressure line 333 and opens up this pressure line to the valve chamber 336. This, in an obvious manner, redirects the pressure air into the air motor 78 to again produce movement of the gripping mechanism 48 toward the free end of the material M. The foregoing, of course, can only occur when the rails 214 are in their raised position holding the switch S1 in its closed position which results in the air valve 312 being pulsed into its position opening up the pressure line 334.

Actuated next in time is the switch S6 which as clearly shown in FIG. 8 results in the energizing of relay R6 and the closing of the relay contact C6. This completes a circuit for the solenoid-operated air valves 338 associated with the air motor 104 of the finger-opening mechanism 102. This pulses the air valve 338 from the position shown into a position channeling pressure air into the air motor 104 causing clockwise rotation of the shaft 112 and of fingers 116 which results in the opening of the movable fingers 70. The open gripping fingers 70, 72 remain open for as long as relay R6 is energized. Thus, it is significant that the holding circuit for the relay R6 includes not only the usual relay holding contact H6, but also the portion of the sub-circuit for the switch S5 including the closed switches S8, S12 and the closed relay holding contact H5. This holding circuit is therefore broken when the gripping mechanism 48 moves into the terminal portion of its movement and actuates the switch S8 open. Upon this occurrence, the air valve 338 returns to the condition depicted in FIG. 8 under spring urgency and pressure air is channeled into the air motor 104 to raise the fingers 116 and permit the gripping mechanism fingers 70, 72 to return to their closed position under spring urgency. When switch S8 is struck, the gripping mechanism 48 has reached the end of its movement placing the fingers 70, 72 about the free end of the material M so that the movable fingers 70 close upon this material.

Returning to the point in time when switch S6 is actuated by the gripping mechanism 48 and prior to actuation of switch S8, as clearly shown in FIG. 2, the position of switch S7 is such that it is first actuated. As shown in FIG. 8A, the closing of switch S7 energizes relay R7 and completes a circuit through the relay contact C7 for the solenoid-actuated air valve 340 associated with the air motor 154 powering the web clamp 150. This pulses the air valve 340 from the position shown into a position channeling pressure air into the end of the air motor 154 causing rotation of the clamp 150 into its position releasing the material M. With the material M released, the gripping mechanism 48 is effective during return movement to its clearance position at the other side of the apparatus 20 to unwind a length of the material M from the supply roll 22. The web clamp 50 remains open as long as the relay R7 is operative. It is therefore significant to note that the holding circuit for the relay R7 is completed through the usual relay hold contacts H7, a closed switch S16, and a closed relay contact H24 of the relay R24. Switch S16 is located in the path of movement of the vertically reciprocating slack-bar 132 of the cloth-length measuring apparatus 130, and is not actuated open until return movement of the slack-bar 132 to its raised starting position after the slack-bar 132 has been effective to unwind a precise measured length of material from the supply roll 22. Thus, the holding circuit for the relay R7 is not broken until a measured length of material has been unwound from the supply roll 22 and at a time when it is desirable that the web clamp 150 return to its closed position about the material M.

It was previously described that upon actuation of switch S8 pressure air is admitted into the air motor 78 powering the gripping mechanism 48 so that there is a reversal in the direction of movement of the gripping mechanism 48 which is effective to return the gripping mechanism 48 to its clearance position depicted in full line in FIG. 2. It is during this portion of the travel of the gripping mechanism 48 that the switches S10 and S11, when struck by the moving gripping mechanism 48 are operational in the control circuitry for the apparatus 20. As best shown in FIG. 8A, switch S10 when actuated closed is effective to energize the relay R10 which completes a circuit through the relay contact C10 for the solenoid-actuated air valve 342 associated with the air motor 134 of the cloth-length measuring apparatus 130. First, the air valve 342 is pulsed out of the position shown into a position admitting pressure air into the air motor 134 starting the slack-bar 132 on its downward stroke. The holding circuit for the relay R10 is completed at this time through the relay holding contact H10, a closed contact P14 of a photocell 344 cooperating with a light source 346 (see FIG. 2) of an electric eye arranged to sense the pattern on material M moving into the apparatus 20, and a closed switch S15 located at the end of the path of movement of the slack-bar 132. No attempt is made to locate switch S15 with any functional relationship to the amount of cloth to be unwound from the supply roll 22 but this switch is provided merely as a limit on the slack-bar stroke in the event that the electric eye having the circuit-breaking switch P14 fails to function. Operating in a manner which is well understood, the switch P14 of the electric eye opens when an opaque area on the cloth M blocks the transmission of light to the photocell 344. In the case of a handkerchief, such an opaque area might be a line which in the final product A borders the edges of the product. In order to avoid an opaque area on the cloth M, other than a repeating pattern line, from inadvertently causing the electric eye switch P14 from opening, the electric eye is not rendered sensitive to light until the switch S13 is closed.

As is best seen from a comparison of FIG. 2 and FIG. 8A, the switch S13 is located along the path of movement of the frame 144 of the slack-bar 132 and has a downwardly extending switch contact 348 which is contacted by a laterally extending member 350 fixedly mounted to the upper end of the frame 144. In practice, after switch S13 is closed, it is contemplated that a transversely oriented opaque pattern line across the material M will eventually be encountered to break the transmission of light to the photocell 344 resulting in the opening of the contacts 314 and the breaking of the holding circuit for the relay R10. When this occurs, the air valve 342 returns under spring urgency to the condition depicted in FIG. 8A wherein pressure air is then effective to reverse the direction of the slack-bar 132.

From the foregoing, it should be appreciated that if it is not possible to control the length of cloth which is unwound from the supply roll 22 by pattern detection, that control can then be exercised by the specific location of the switch S15 which when actuated also will result in a reversal in direction of the slack-bar 132.

During return movement of the slack-bar 132 to its raised starting position, switches S16 and S17 are actuated by physical contact with the previously mentioned laterally extending member 350. As was previously explained in connection with FIG. 8A, the striking of switch S16 breaks the holding circuit for the relay R24 and results in movement of the movable rails 214 from their raised position above the cloth M into a holding position upon the material. Still referring to FIG. 8A, the closing of switch S17 energizes relay R17 and completes a circuit through the relay contact C17 for the solenoid-operated valve 352 associated with the air motor 164 powering the knife clamp 160. Thus the knife clamp 160 is rotated into a clamping position parallel and slightly spaced from the web clamp 150 which is then in its clamped position about the material M. With the material securely held by the clamps 150, 160, the cloth is in a proper condition to receive a transverse cut by the rotary cutter 172. The cutting portion of the machine cycle is initiated by the closing of the switch S18 which, as clearly shown in FIG. 2, is mounted in a position in which it is actuated by contact with an end of the lever 170 of the knife clamp 160. As shown in FIG. 8A, closing of the switch S18 energizes the relay R18 completing a circuit through the relay contact C18 for a solenoid-actuated air valve 354 associated with the air motor 194 powering the rotary cutter 172 through movement transversely of the material M then in position at the blank-forming station 49. This movement of the rotary cutter 172 starts with the pulsing of the air valve 354 into a position channeling the pressure air into the air motor 194 such that the rotary cutter 172 is actuated through movement toward the sewing machine-end of the apparatus 20. After the rotary cutter 172 has completed a cut transversely of the material M and has thus formed the work-in-process blank B, the support 184 for the rotary cutter, as clearly shown in FIG. 3, makes contact with the switches S20, S21 and S22. As clearly shown in FIGS. 8, 8A, the actuation of the switches S20–S22 breaks the holding circuits for previously energized relays, and thus essentially clears the circuitry for the next cycle of operation of the apparatus 20. It is further contemplated that the solenoid-operated air valves of the sub-circuits associated with the switches S20–S22 will be of the type having a spring return to a prescribed condition such as that depicted in FIGS. 8, 8A. Thus, with the opening of the switches S20–S22, the respective air valves return under spring bias to the conditions depicted in these figures. This results in pressure air being channeled through the valve 352 into the air motor 164 so as to power the knife clamp 160 through a clockwise rotation into an open position, the air valve 322 assuming a position where pressure air is channeled through this valve into the air motor 252 actuating the rack 250 downwardly and through its power stroke, and finally the air valve 354 assuming a position channeling pressure air into the air motor 194 so that the rotary knife 172 is returned to its original position to the rear of the apparatus 20.

The next essential portion of the machine cycle is the transporting of the material blank B from the blank-forming station 49 forwardly to the sewing machines 34, 36. This, it will be recalled, is achieved by the blank-advancing mechanisms 50, 52. However, prior to this, it is necessary that the gripping mechanism 48 be actuated out of gripping contact with the material blank B, and this occurs when the rails 214 come to rest in the cooperating stationary rails 216 and in so doing one rail actuates the switch S19 closed. As previously explained, this produces rotative movement in the fingers 116 opening the gripping fingers 70, 72.

Another necessary condition of the sewing machine-end of the apparatus 20 is the raising of each presser foot 282 preparatory to the transporting of the blank B beneath this structure. As previously explained, this position of the presser foot 282 is achieved by the closing of switch S23 during the rack power stroke followed by the closing of switch S2 by the gripper mechanism 48.

The blank-advancing mechanisms 50, 52 are started in operation by the power stroke of the rack 250 which provides belt movement resulting in the transportation of the blank B from the blank-forming station 49 towards the sewing machines 34, 36. This belt motion will continue until the piston operating within each air motor 252 is bottomed and the piston rod mounting the rack 250 cannot be withdrawn any further within the air motor 252. At this time it is contemplated that the leading edge of the blank B will be transported up to the throat of the folding tool 292. Having reached this point of feed movement, the beam of light from the light source 318 will be reflected off the surface of the material into the photocell mounted on each of the sewing machines resulting in the closing of the electric eye internal switch PC. This places the holding circuit for the relay R3 associated with switch S3 in condition to perform its function when the switch S3 is actuated. Actuation of switch S3, however, is produced by contact of the gripping mechanism 48 against this switch. This movement in the gripping mechanism 48 is initiated almost immediately after the blank-forming station 49 has been cleared by forward movement of the material blank B towards the sewing machines 34, 36. To actually trace the start of this movement, it is necessary to go back to the return movement of the rotary cutter 172 to its position rearwardly of the apparatus 20. As best shown in FIG. 3, switch S24 is located in the path of movement of the rotary cutter 172, and as clearly shown in FIG. 8A, when actuated, results in the energizing of relay R24. The closing of relay contact C24 pulses the air valve 310 into an appropriate position which results in the air motors 204, 206 raising the movable rails 214. This movement, it will be recalled, starts each machine cycle and, as best shown in FIG. 8, results in the switch S1 being closed and in the manner previously explained results in pressure air being admitted into the air motor 78 such that the gripping mechanism 48 is actuated through its movement across the apparatus 20 into a position for gripping the free edge of the material M. It is, of course, during this movement that switch S3 is actuated which, with the electric eye switch PC closed, results in the closing of the relay R3 and the holding of this relay in a closed position completing a circuit through the contacts C3. This completed circuit causes engagement of the sewing machine clutches and sewing operation of the sewing machines 34, 36. Sewing continues until the material blank B is carried by the sewing machine feed dogs past the sewing machines 34, 36 and the light from the light source 318 is no longer reflected into the photocell of the electric eye and the electric eye switch PC accordingly opens, breaking both the holding circuit for relay R3 and the clutch-energizing circuit of the relay contact C3.

Note should be made of the hand-operated master switch S25 in the sub-circuit of the switch S24 which must be closed for automatic recycling of the apparatus 20. It is intended that switch S25 be located within the reach of the operator and actuated open only when it is intended to run the apparatus 20 through a single cycle. With switch S25 in an open position, the actuation of the switch S24 does not automatically recycle the apparatus, but a single cycle is possible since the starting switch SS by-passes the open switch S25.

Only brief reference will now be made to FIG. 9 which is included as part of the present description as a convenient graphic summary of the prescribed sequence of movements produced by the actuation of the various switches, and generally the duration of these movements. Thus, for example, it may easily be determined from FIG. 9 that switch S3 effects the operation of the sewing machine, and that the specific function of this switch is to actuate the sewing machine from its off-condition to its on-condition. Moreover, the on-condition of each sewing machine is maintained until the opening of the electric eye switch PC when each sewing machine again returns to its off-position. Taking just another example from the chart of FIG. 9, but this time starting with a machine part listed in a column at the left thereof, it will be noted that adjacent to each part there is a notation of two possible conditions of this part. Thus, there is the notation "grippers" which will be understood to be the gripping fingers identified by the reference numerals 70, 72, and a further reference to the two conditions of this mechanism, namely, "open" and "closed." The chart of FIG. 9 clearly indicates that the grippers are closed until the actuation of switch S6 which results in the opening of this mechanism. The grippers then remain open until the actuation of switch S8. Thereafter this mechanism remains closed until the actuation of the switch S19 when they are again opened and remain open until the actuation of the recycle switch S24. Actuation of the recycle switch S24 closes the gripper mechanism provided, of course, that the main stop switch S25 is in a closed condition necessary for machine automatic recycle. As indicated by the dash lines in the upper right-hand corner of the chart of FIG. 9, with switch S25 open and thereby preventing recycling, the rails remain down when switch S24 is actuated, whereas with switch S25 closed, the actuation of switch S24 raises the rails against switch S1 and does provide machine recycling.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An apparatus for making handkerchiefs and the like from a supply roll of material having previously hemmed edges including means for rotatably mounting said supply roll of material, means for successively unwinding measured lengths of said material from said supply roll, means forming a blank-forming station and effective to sever said lengths of material from said supply roll to form blanks thereof having unsewn opposite side edge portions oriented transversely of said hemmed edges, sewing machines for hemming said side edge portions of each blank, and blank-advancing means located between said blank-forming station and said sewing machines comprising a cooperating pair of an upper and lower endless belt located rearwardly of each sewing machine, means supporting said belts of each pair in facing relation to each other to define a feed path to said sewing machines, motor means for simultaneously powering said belts in movement along said defined feed path to transport a blank from said blank-forming station to said sewing machines, and control means operatively connected to said motor means to provide only intermittent operation thereof wherein only the leading edge of each blank is transported to said sewing machines and, during intervals between operation, said sewing machines transport the blank against the drag resistance exerted on the blank by the belts.

2. An apparatus as defined in claim 1 including pressure-adjusting means operatively associated with one of said upper and lower belts for regulating the extent of frictional contact made with said blank and thus the drag resistance exerted by the blank-advancing means during sewing.

3. An apparatus as defined in claim 1 wherein the lower belt is extended rearwardly beyond the upper belt to facilitate the feeding of the blank between the belts.

4. An apparatus as defined in claim 3 including pressure-adjusting means operatively associated with said upper belt for regulating the extent of pressure contact made by this belt against said blank and thus the drag resistance exerted on the blank during sewing.

5. In apparatus for advancing blanks of material for making handkerchiefs and the like toward sewing machines which sew opposite side edge portions of the blank into hems, the combination with each sewing machine of blank-advancing means comprising an upper and a lower endless belt and means supporting each in facing relation to each other to define a feed path to said sewing machine, motor means for simultaneously powering said belts in movement towards said sewing machine for transporting a side edge portion of said blank which is interposed between said belts to said sewing machine, and control means operatively connected to said motor means for intermittently operating said motor means, whereby during operation of said motor means the leading edge of said blank side edge portion is transported to said sewing machine and the length portion from said leading edge rearwardly to said trailing edge remains interposed between said belts and during intervals between operation of said motor means said sewing machine is effective to transport said blank against the drag resistance exerted by said belts on said blank.

6. A blank-advancing means as defined in claim 5 wherein said motor means includes an air cylinder, a reciprocating rack powered by said air cylinder, and a pinion in meshing engagement with said rack and operatively connected to drive said belts in movement, whereby the extent of belt movement is limited to the power stroke of the rack.

7. A motor means as defined in claim 6 including means for adjusting the starting position of the rack incident to the power stroke thereof, whereby belt movement corresponds to the extent of rack movement from said starting to the ending positions of the rack during said power stroke.

8. A blank-advancing means as defined in claim 5 including pressure-adjusting means operatively associated with one of said upper and lower belts for regulating the extent of frictional contact made with said blank and thus the drag resistance exerted by said blank-advancing means during sewing.

9. A blank-advancing means as defined in claim 5 wherein one of said belts is extended rearwardly beyond the other belt to facilitate the feeding of the blank between the belts.

10. A blank-advancing means as defined in claim 8 wherein said pressure-adjusting means includes a support located adjacent the upper belt, and a member mounted for vertical movement on said support and effective to be selectively urged into contact against said upper belt for regulating the pressure contact of said upper belt against the blank.

11. A blank-advancing means as defined in claim 9 wherein the lower belt is the belt preferably extended rearwardly beyond the upper belt to facilitate the feeding of the blank between the belts.

12. A blank-forming apparatus comprising a supporting frame, a supply of material located adjacent said supporting frame, cloth-gripping means movable in one direction on said supporting frame from a clearance position remote from said supply of material into gripping engagement with said material and in a reverse direction back to said clearance position for successively unwinding lengths of said material from said supply, material-cutting means effective to sever said unwound lengths of material from said supply to form blanks thereof, blank-advancing means located at the clearance position of said cloth-gripping means and at said severed material edge and effective to transport said blank clear of said supporting frame, air motor means for powering in movement said cloth-gripping means, said material-cutting means, and said blank-advancing means, valve means operatively associated with said air motor means and having an operative position for determining the direction of movement provided by said air motor means, and plural switching means actuated by physical contact located in the path of movement of said cloth-gripping means, material cutting means, and said blank-advancing means and operatively connected to said valve means, said switching means being arranged for actuation in a prescribed sequence to thereby produce movements during the operation of said blank-forming apparatus in a corresponding prescribed sequence.

13. A blank-forming apparatus as defined in claim 12 including sewing machines and cooperating edge-folding attachments mounted thereon located on said supporting frame in position to hem the opposite edges of said blanks being transported to said sewing machines by said blank-advancing means.

14. A blank-forming apparatus as defined in claim 13 including control means for operating said sewing machines and said blank-advancing means in tandem, whereby during sewing operation of said sewing machines the material being sewn is transported by said sewing machines against the drag resistance being exerted thereon by the non-operative blank-advancing means.

15. A blank-forming apparatus as defined in claim 12 including a cloth-measuring means supported on said supporting frame in an elevated position between the clearance and cloth-engaging positions of said cloth-gripping means, said cloth-measuring means being mounted for reciprocating movement along a vertical path of movement and when actuated along said path of movement being adapted to make contact with a length of material held by said cloth-gripping means across said path of movement to thereby unwind said material from said supply roll to a predetermined length determined by the stroke of said cloth-measuring means.

16. A blank-forming apparatus as defined in claim 15 including photoelectric cell means mounted on said supporting frame in a position to scan the material being unwound from the supply roll and operatively connected to said cloth-measuring means to terminate the stroke thereof in accordance with the scanned condition of said material.

17. A blank-forming apparatus as defined in claim 13 wherein the motor means for said blank-advancing means transporting said blank to said sewing machines includes an air cylinder, a reciprocating rack powered by said air cylinder, and a pinion in meshing engagement with said rack and operatively connected to drive said belts in movement, whereby the extent of belt movement is limited to the power stroke of the rack.

18. A motor means as defined in claim 17 including means for adjusting the starting position of the rack incident to the power stroke thereof, whereby belt movement corresponds to the extent of rack movement from said starting to the ending positions of the rack during said power stroke and can be effectively adjusted to transport said blank to a precise location at said sewing machines.

19. A blank-forming apparatus as defined in claim 12 including at least a first switch located on said supporting frame in the path of movement of said cloth-gripping means and operatively connected to the one of said valve means associated with the air motor powering said material-cutting means and effective when actuated to initiate the movement of said material-cutting means, at least a second switch located on said supporting frame in the path of movement of said material-cutting means and operatively connected to the one of said valve means associated with the air motor powering said blank-advancing means and effective when actuated to initiate the movement of said blank advancing means, and at least a third switch located on said supporting frame in the path of movement of said blank-advancing means and operatively connected to the one of said valve means associated with the air motor powering said cloth-gripping means and effective when actuated to initiate the movement of said cloth-gripping means, whereby the successive actuation of said first, second and third switches provides automatic cyclical operation of said apparatus.

20. A blank-forming apparatus as defined in claim 19 including a cloth-measuring means supported on said supporting frame in an elevated position between the clearance and cloth-engaging positions of said cloth-gripping means for reciprocating movement along a vertical path of movement and when actuated through movement being effective to unwind said material from said supply roll to a predetermined length determined by the stroke of said cloth-measuring means, and at least a fourth and a fifth switch respectively located in the path of movement of said cloth-gripping means and said cloth-measuring means and operatively connected to operate said cloth-measuring means after the operation of said cloth-gripping means and thereafter to start the operation of said material-cutting means.

21. A blank-forming apparatus as defined in claim 20 including photoelectric cell means functioning as a sixth switch and mounted on said supporting frame in a position to scan the material being unwound from the supply roll, said photoelectric cell means being operatively connected to terminate the stroke of said cloth-measuring means in accordance with the scanned condition of said material and thereafter to start the operation of said material-cutting means.

22. A blank-forming apparatus comprising a supporting frame, a supply of material located adjacent said supporting frame, material-gripping means on said supporting frame having a material-positioning stroke operatively effective to successively position lengths of material from said supply within said supporting frame, material-cutting means on said supporting frame having a materal-severing stroke operatively effective to successively sever said lengths of material from said supply to form blanks thereof, blank-advancing means on said supporting frame having a material-transporting stroke operatively effective to successively transport said blanks clear of said supporting frame, and control means operatively associated with each of said material-gripping means, material-cutting means, and blank-advancing means including switch means operatively arranged to be actuated during said respective strokes thereof to produce said strokes in a prescribed sequence.

23. A blank-forming apparatus as defined in claim 22 including pneumatic means operatively arranged to power said material-gripping means, material-cutting means, and blank-advancing means through their respective strokes and operated by said control means to produce said strokes in said prescribed sequence.

References Cited

UNITED STATES PATENTS

| 2,053,257 | 9/1936 | Anderson | 112—2 |
| 2,546,831 | 3/1951 | Newell | 112—2 |
| 2,738,746 | 3/1956 | Mac Isaac et al. | 112—203 XR |
| 2,834,307 | 5/1958 | Jones et al. | 112—2 |
| 2,940,404 | 6/1960 | Damon | 112—10 |

JORDAN FRANKLIN, *Primary Examiner.*

JAMES R. BOLER, *Examiner.*